United States Patent
DiMambro

(10) Patent No.: US 7,356,039 B1
(45) Date of Patent: Apr. 8, 2008

(54) METHOD AND APPARATUS FOR DESCRIBING MULTIPLE PACKETS TO HARDWARE

(75) Inventor: Francesco R. DiMambro, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 963 days.

(21) Appl. No.: 10/667,562

(22) Filed: Sep. 22, 2003

Related U.S. Application Data

(63) Continuation-in-part of application No. 10/434,810, filed on May 9, 2003, which is a continuation-in-part of application No. 10/170,919, filed on Jun. 12, 2002.

(51) Int. Cl.
*H04L 12/28* (2006.01)

(52) U.S. Cl. ...................................... 370/411; 709/230

(58) Field of Classification Search ................ 370/411, 370/471, 475, 473
See application file for complete search history.

(56) References Cited

U.S. PATENT DOCUMENTS

| | | | |
|---|---|---|---|
| 5,475,681 A * | 12/1995 | White et al. ................. 370/349 |
| 5,495,482 A * | 2/1996 | White et al. ................. 370/419 |
| 6,434,620 B1 * | 8/2002 | Boucher et al. ............ 709/230 |
| 6,611,883 B1 * | 8/2003 | Avery ........................... 710/22 |
| 6,708,233 B1 * | 3/2004 | Fuller et al. .................. 710/22 |

* cited by examiner

*Primary Examiner*—Edan Orgad
*Assistant Examiner*—Lawrence J Burrowes
(74) *Attorney, Agent, or Firm*—Park, Vaughan & Fleming LLP

(57) ABSTRACT

A system and method for describing multiple packets to a communication module or device without requiring descriptors for each packet. A device driver for the communication apparatus receives a set of packet headers and a set of packet payloads from an upper layer protocol. The headers may be received in a header buffer, and the payloads may be received in a separate data buffer. Or, the packets may be received, in assembled form, in a single buffer. The device driver configures a single descriptor to describe the multiple packets to the communication apparatus. The descriptor includes base address(es) of the buffer(s) in which the headers, payloads or assembled packets are stored, and the lengths of the individual headers, payloads or assembled packets. If the buffer contents are not packed, the descriptor may also include offsets of the headers, payloads or packets.

17 Claims, 4 Drawing Sheets

| Packet_count 202 | Headers_packed 204 | Data_packed 206 |
|---|---|---|
| CS_enable 212 | CS_start 214 | CS_stuff 216 |
| Header_address_base 222 |||
| Data_address_base 232 |||
| Data_length 242a | Header_length 244a ||
| Data_length 242b | Header_length 244b ||
| ⋮ | ⋮ ||
| Data_length 242n | Header_length 244n ||

DESCRIPTOR 200

METHOD AND APPARATUS FOR DESCRIBING MULTIPLE PACKETS TO HARDWARE

RELATED APPLICATION

This application is a continuation-in-part of U.S. application Ser. No. 10/434,810, filed May 9, 2003, which is a continuation-in-part of U.S. application Ser. No. 10/170,919, filed Jun. 12, 2002, both of which are hereby incorporated by reference.

BACKGROUND

This invention relates to the field of computer systems. More particularly, an apparatus and methods are provided for facilitating the preparation of multiple packets for transmission from a communication device (e.g., network interface circuit, channel adapter).

Computer systems and other devices for transmitting packets often use descriptors to describe or prepare the packets for transmission. With present descriptor rings, each descriptor describes just one packet or one portion of a packet to be transmitted by the transmission hardware. Thus, for each packet passed to a device driver for the hardware to transmit, a separate descriptor may be configured and forwarded to the hardware by the device driver. Or, multiple descriptors may be needed for a single packet. For each descriptor it receives from the device driver, the hardware is empowered to retrieve one packet or packet fragment from memory. When a sufficient number of descriptors have been read, it can assemble a packet and transmit it.

Although transmission rates continue to rapidly increase, the time needed to setup and tear down a descriptor is relatively constant. For example, each descriptor may require mapping between a system's virtual address space and the physical address space of its transmission hardware. Memory mapping during setup and tear down is relatively expensive in terms of time. As transmission rates increase, more and more packets must be passed to a communication device from its driver, and the use of one or more descriptors for every packet becomes more and more burdensome.

SUMMARY

Therefore, what is needed is an apparatus and method for facilitating the transmission of multiple communications (e.g., packets) using one or a limited number of descriptors (e.g., two).

In one embodiment of the invention, an apparatus and method are provided for describing multiple packets to a communication module or device using a single descriptor. A device driver for the communication apparatus receives a set of packet headers and a set of packet payloads from an upper layer protocol. Illustratively, the headers may be received in a header buffer, and the payloads may be received in a separate data buffer. Or, the packets may be received in assembled form, in a single buffer.

The device driver configures a single descriptor to describe the multiple packets to the communication hardware and enable the hardware to retrieve the packets or packet contents for assembly. The descriptor may include the base address(es) of the buffer(s) in which the headers, payloads or assembled packets are stored, and the lengths of the individual headers, payloads or assembled packets. If the buffer contents are not packed, the descriptor may also include offsets of the headers, payloads or packets within the buffer(s).

The descriptor may also include indicators for indicating whether the buffers are packed, a checksum_enabled indicator to indicate whether checksums are enabled, a checksum_start offset (which may be the same for each packet), a checksum_stuff offset (which may be the same for each packet), a checksum type, etc. The single descriptor may thus be a customized descriptor, although a traditional descriptor for an existing communication device may be modified to reference the custom descriptor, to promote compatibility with existing communication devices.

In another embodiment of the invention, a sample of a packet's payload may be included in the descriptor to promote error checking.

In one alternative embodiment of the invention, multiple packets are described to a communication hardware device using just one or two traditional descriptors. In this alternative embodiment, a device driver populates a meta-structure with meta-data regarding the packets, plus the headers and/or payloads of the packets. A second descriptor may also be employed to reference headers and/or payloads. In either case, the headers are stored together, as are the payloads, to facilitate rapid, easy retrieval of the packet contents by the hardware.

DESCRIPTION OF THE FIGURES

FIG. 2 is a block diagram of a descriptor configured to describe multiple packets to a communication apparatus, in accordance with an embodiment of the invention.

DETAILED DESCRIPTION

Figure 1:
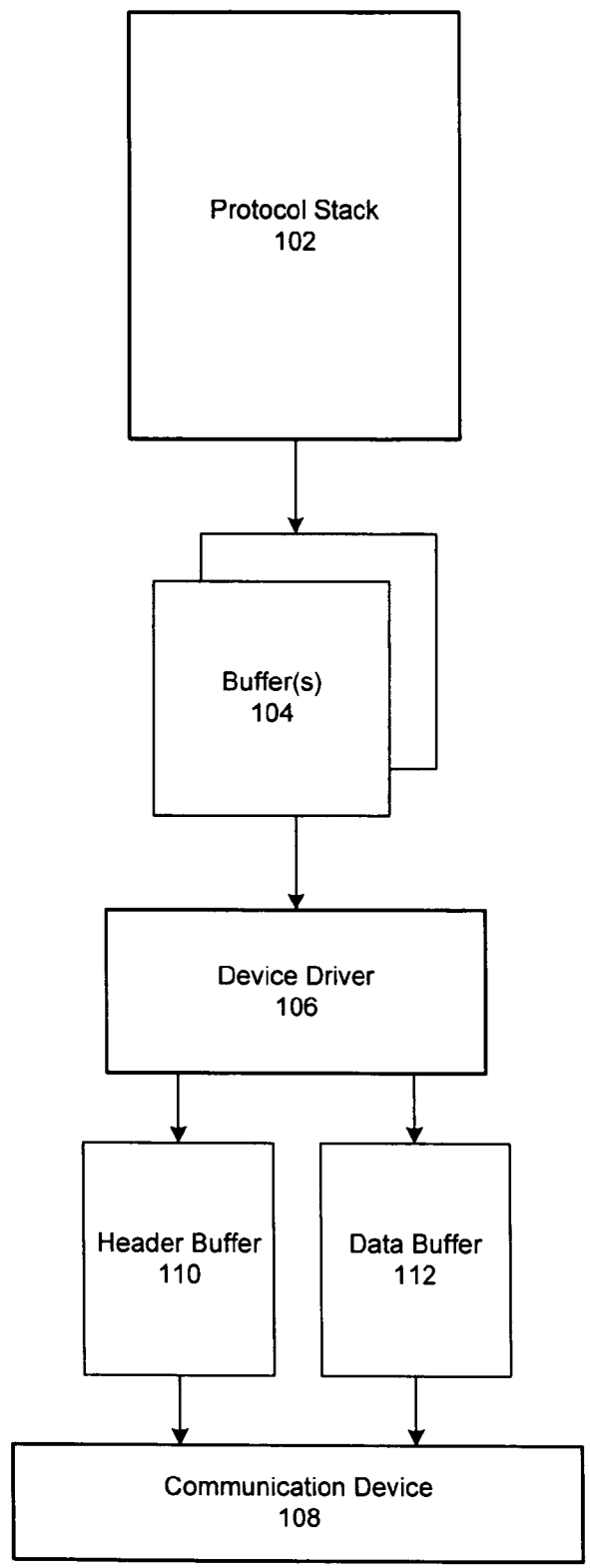
FIG. 1 is a block diagram depicting the description of multiple packets at a time to a communication apparatus from its device driver, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In one embodiment of the invention, multiple communications (e.g., packets) or multiple fragments of a single communication are described (e.g., to a communication device) without requiring a separate descriptor for each communication or communication fragment. For example, just one or two descriptors may be used in place of N descriptors, where N is greater than 2. Using the descriptor(s), multiple packets or packet portions can therefore be described to a communication device from a device driver, thereby expediting the device's retrieval of the packets and the overall communication process.

U.S. patent application Ser. No. 10/434,810, entitled "System and Method for a Multi-Packet Data Link Layer Data Transmission" and filed May 9, 2003, describes a system and method for passing multiple packets or multiple portions of a packet together, from an application or higher-level protocol, to a device driver.

One Embodiment of the Invention

In embodiments of the present invention, a device driver for a communication device or interface (e.g., a network interface circuit, a channel adapter) configures one or two descriptors, as described below, and passes the descriptor(s) to the device. Using information in the descriptor(s), the device can simultaneously (or quickly and successively) retrieve multiple headers, multiple payloads and/or multiple complete packets (i.e., headers and payloads already assembled into packets) from one or more memory buffers.

FIG. 1 demonstrates how multiple communications, or multiple fragments of one communication, may be passed from a device driver to a corresponding hardware device, according to one embodiment of the invention. In this embodiment, a single descriptor is used to describe the communications or communication fragments to the device. Further, the communications may be in the form of packets in this embodiment, but may take other forms (e.g., cells, frames) in other embodiments of the invention.

In this embodiment, multiple packets or portions of packets are generated by a program (e.g., in user space) and processed by protocol stack 102. Protocol stack 102 may include protocols such as IP (Internet Protocol), TCP (Transport Control Protocol) and/or others.

The protocol stack forwards buffer(s) 104, containing the packets or packet portions, to device driver 106. More particularly, the protocol stack passes the packets or packet portions to device driver 106 as a set of contiguous assembled packets (i.e., headers and payloads) or as separate sets of headers and payloads to be assembled. Thus, a buffer passed to device driver 106 from the protocol stack may be of any size and may contain any number of headers, any number of packet payloads, or any number of headers and payloads already assembled into packets.

Device driver 106 comprises a driver for communication device 108. Device 108 may be a channel adapter, a network interface circuit (NIC), a MAC (Medium Access Control) module of a channel adapter or NIC, or some other communication device or module.

Device driver 106 passes the packets to device 108 via header buffer 110 and/or data buffer 112. In the illustrated embodiment of the invention, packet headers are stored (e.g., packed) within header buffer 110, while payloads are stored in data buffer 112. In other embodiments, one or the other of header buffer 110 and data buffer 112 may be omitted, in which case the packets are passed in the other buffer (e.g., in assembled form).

To communicate the packets to device 108, a single descriptor of a descriptor ring is configured by device driver 106 to describe the multiple packets to the hardware. The single descriptor may be configured to describe virtually any number of packets, for whichever buffer configuration is employed (e.g., just a header buffer, just a data buffer, both header and data buffers).

The single descriptor is formatted to identify both buffers, if necessary, and provide information for locating each individual header, each individual payload, or each individual assembled packet. As a result, device 108 is able to fetch multiple packets, headers or payloads with a single DMA (Direct Memory Access) mapping.

FIG. 2 is a block diagram of a descriptor for facilitating the communication of multiple packets at once, from a device driver to its communication device, according to one embodiment of the invention. Other embodiments of the invention are not limited to the configuration illustrated in FIG. 2. In particular, a descriptor in another embodiment of the invention may include other fields and information not depicted in FIG. 2, and/or may omit information depicted in FIG. 2.

Descriptor 200 of FIG. 2 includes packet_count 202, which indicates the number of packets described by the descriptor. In one embodiment, the number of packets handled by one descriptor is limited to 255, thereby requiring no more than 8 bits for the packet_count value.

Headers_packed 204 and data_packed 206 are indicators configured to indicate whether the header and/or payloads are packed in their buffers. In one embodiment of the invention, headers and payloads are stored in separate buffers, and each header and payload is stored contiguous with the preceding and following headers and payloads. In another embodiment, headers and/or payloads may not be packed; instead, they may begin at predetermined or computable boundaries (e.g., cacheline boundaries). Headers_packed 204 and/or data_packed 206 may be single-bit indicators, or may comprise values indicating how or where the headers or payloads are aligned.

In the illustrated embodiment of the invention, CS_enable 212 indicates whether checksums are enabled for the packets. If checksums are enabled, they may be computed by the hardware just before the packets are transmitted. CS_start 214 indicates the location in a packet where the checksum calculation is to begin; CS_stuff 216 indicates where the checksum is to be stored in the packet. In this embodiment, each packet's checksum may be computed from the same point (e.g., the same offset indicated by CS_start 214) and may be stored at the same location (e.g., the offset indicated by CS_stuff 216).

Header_address_base 222 is the base address of a header buffer in which the packets' headers are stored, if a header buffer is used. Similarly, data_address_base 232 is the base address of a data buffer in which the packets' payloads are stored, if a data buffer is used. As described above, in different embodiments of the invention, headers and payloads may be passed to a communication device in separate header and data buffers, or may be combined in either. Thus, one of the address base values may be unused.

Then, for each packet, descriptor 200 includes a length of the packet's payload and its header(s). Thus, for a first packet, data_length 242a indicates the size of the packet's payload, while header_length 244a indicates the size of the packet's header. In this embodiment of the invention, headers and payloads are stored contiguously in header and data buffers, and therefore each component's offset within the header or data buffer can be computed by summing the lengths of the preceding components in the same buffer.

In an embodiment of the invention in which headers or payloads are not stored contiguously, each packet's entry in descriptor 200 may also include one or more offset values indicating where the packet's headers and payloads will be found. Alternatively, headers_packed 204, data_packed 206 or some other value stored in descriptor 200 may indicate how or where each packet's header or payload can be located (e.g., at the next cacheline boundary after the previous packet's header or payload).

Thus, in the illustrated embodiment of the invention, for each set of multiple packets passed to the device driver of a communication device or module, all the packets' headers and payloads can be described to the communication device with a single descriptor.

Using a single descriptor for multiple packets can save a significant amount of descriptor space. For example, the location of each packet header or payload can be computed from previous headers or payloads (i.e., by adding the size of each header or payload to the base address for headers or payloads), rather than having to include a lengthy address for each packet.

Descriptor 200 may be augmented or modified for particular operating environments. For example, if used within an InfiniBand network, the descriptor may also be configured with different key values needed by an InfiniBand node, such as a header R_key and/or a payload R_key.

As another example, the packet-specific information in descriptor 200 (i.e., header length, payload length) may be augmented with a copy of the first byte (or other portion) of the packet's payload, to help ensure retrieval of the correct payload from the buffer(s). As another example, the header and data buffers may be configured with extra space for appending an Ethernet header or other lower-layer header.

One skilled in the art will appreciate that descriptor 200 may be modified in many ways to suit different operating environments and requirements. Also, descriptor 200 may include a bit, flag or other indicator configured to identify itself as a multi-packet or multi-fragment descriptor.

In one alternative embodiment of the invention, a traditional descriptor (i.e., a descriptor configured to describe one packet or one portion of a packet) may be modified to reference or point to a descriptor configured to describe multiple packets. Illustratively, the traditional descriptor would be configured with an indicator for indicating whether it is describing a multi-packet descriptor or a single packet or packet portion. Many traditional descriptors contain reserved or unused bits or flags that could be used as such an indicator.

Figure 3:
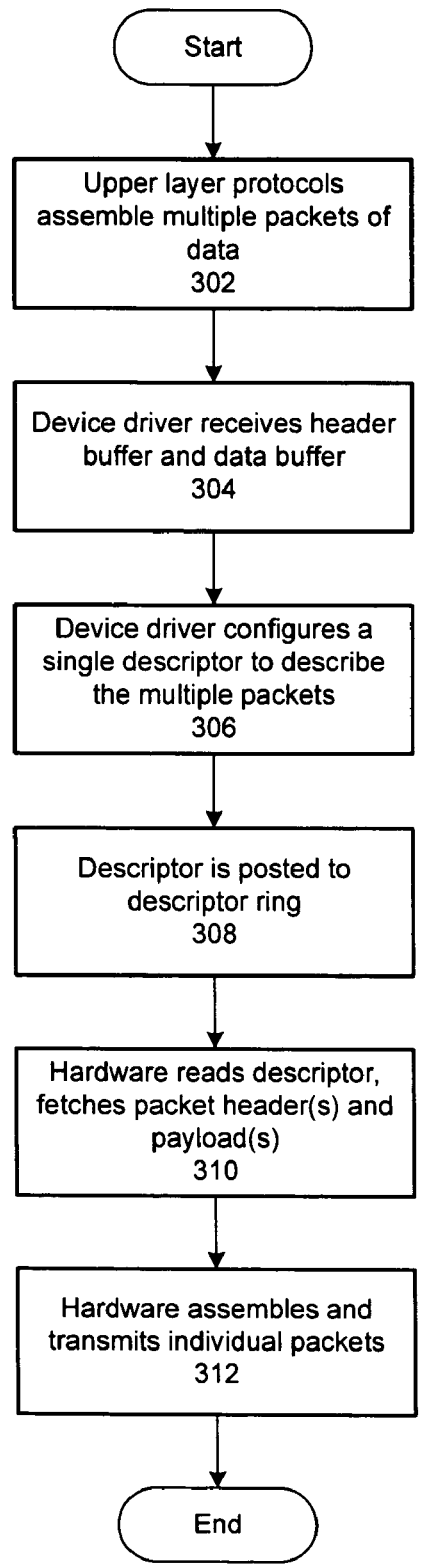
FIG. 3 is a flowchart illustrating one method of describing multiple packets to a communication apparatus, in accordance with an embodiment of the invention.

FIG. 3 demonstrates a method of using a single descriptor to facilitate the passing of multiple packets to a communication device or module from its device driver, according to one embodiment of the invention.

In operation 302 of FIG. 3, an application program and/or upper layer protocols of a protocol stack assemble a set of data to be transmitted across a wired or wireless communication link (e.g., a network). The upper layer protocols assemble upper-layer headers for multiple packets to be used to carry the data. In this embodiment, the upper layer protocols assemble the packets' payloads contiguously within a first buffer (i.e., a data buffer) and assemble the packets' headers contiguously within a second buffer (i.e., a header buffer). In another embodiment, the packets may be stored in assembled form in one buffer. In yet another embodiment, the headers or payloads are not stored contiguously.

In operation 304, a device driver for a communication device or module that will transmit the data receives the header and data buffers from an upper layer protocol.

In operation 306, the device driver configures a single descriptor to describe the multiple packets to the communication apparatus. The single descriptor may be configured with much or little similarity to descriptor 200 of FIG. 2. Thus, the single descriptor is formatted with the base address (es) of the buffer(s) in which the packets will be provided to the communication apparatus, plus lengths and/or offsets of each packet's header and payload within the buffer or buffers.

In operation 308, the descriptor is posted to a descriptor ring accessible to the communication apparatus.

In operation 310, the communication apparatus reads the descriptor and accesses the header and data buffers. The apparatus may retrieve one packet's header and payload at a time from each buffer, or may read the entire contents of either buffer at once.

In operation 312, the communication apparatus assembles each packet in turn and transmits it. For each packet, the apparatus may append the packet's header to its payload, compute a checksum, stuff the checksum into the packet, etc.

Thus, in an embodiment of the invention described in this section, a new or customized descriptor is used to describe multiple packets or packet fragments to a communication module or device. To promote compatibility with existing hardware, traditional descriptors may be generated in addition to the new descriptor(s). However, the hardware is able to access the multiple packets or packet fragments without having to read the traditional descriptors.

One Alternative Embodiment of the Invention

In another embodiment of the invention, the process of transmitting multiple packets or other communications, or preparing them for transmission, is further streamlined. In an embodiment of the invention discussed in the previous section, a new type of descriptor could be configured to describe to a communication device the information or meta-data needed to transmit multiple packets.

In an embodiment of the invention described in this section, a traditional descriptor and descriptor ring may be employed in a method and apparatus for describing multiple packets or packet fragments to a communication module or device at one time.

Figure 4:
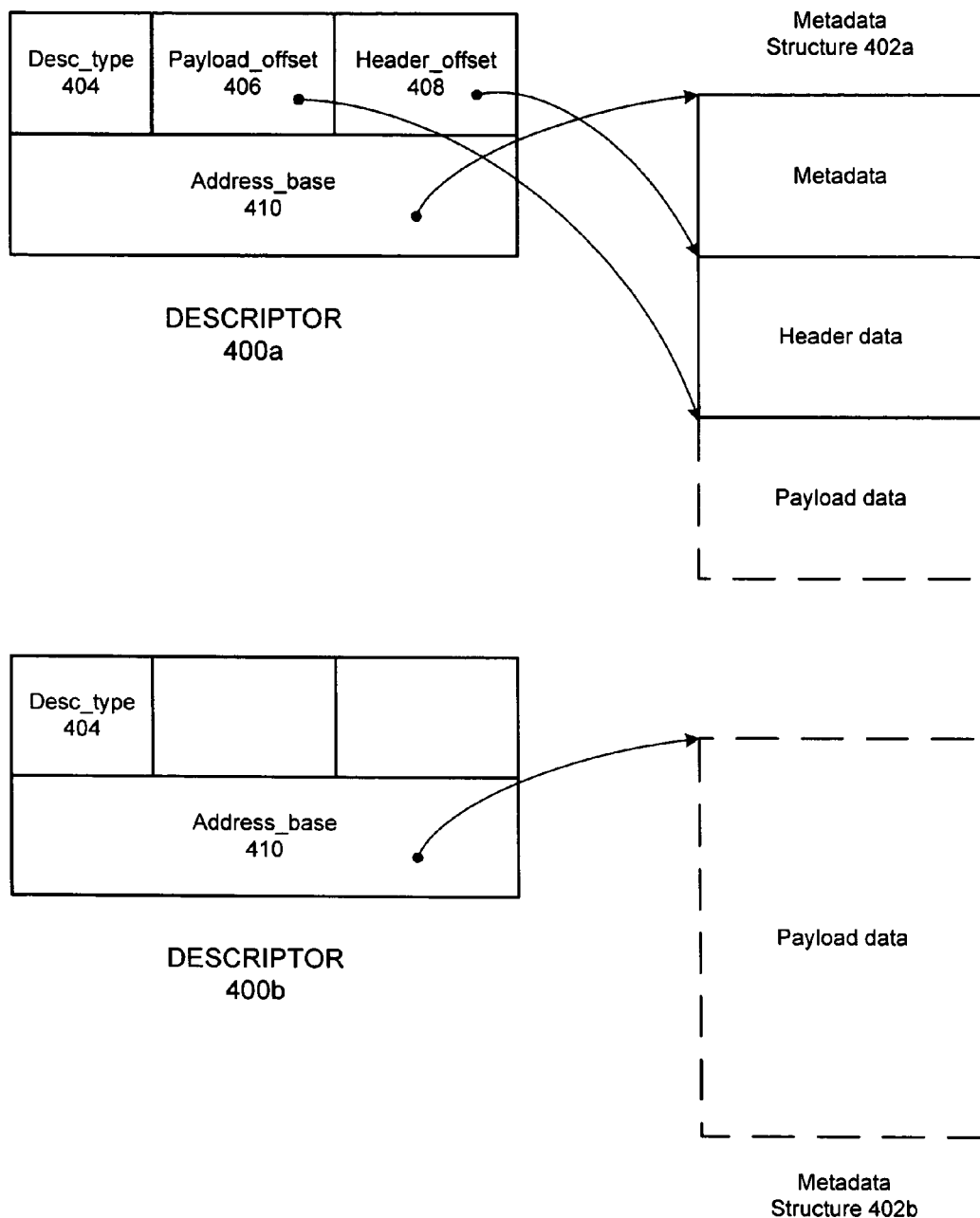
FIG. 4 illustrates the use of one or two descriptors to describe multiple packets to a communication module or device, according to one embodiment of the invention.

FIG. 4 depicts a descriptor configuration according to one implementation of this embodiment, in which at most two descriptors are needed to describe multiple packets or packet fragments to the hardware.

In the embodiment depicted in FIG. 4, header data and meta-data are combined into meta-data structure 402a. Payload data may be stored in structure 402a and/or in a separate structure 402b. Illustratively, both descriptors may be needed when the amount of payload data exceeds a threshold and/or when the payload data are assembled in a separate buffer before being received at the device driver.

Descriptor 400a is configured to describe metadata structure 402a to the hardware, while descriptor 400b describes metadata structure 402b. Each descriptor includes type field 404, which is configured to identify the descriptors as multi-packet (or multi-fragment) descriptors. Each descriptor also includes address_base field 410 to identify where the corresponding structure is located.

Descriptor 400a also includes payload_offset field 406, which identifies the start of the payload data in structure 402a (if that structure contains payload data), and header_offset field 408, which identifies the start of the header data in structure 402a. In descriptor 400b, fields 406, 408 may be zeroed or otherwise marked as not used.

Header_offset 408 may reflect the size of the metadata section of structure 402a, and may be specified in terms of bytes, lines or other units. Payload_offset 406 may reflect the size of the header section, and may be expressed in bytes, as a number of headers, or in some other form.

In the illustrated embodiment of the invention, metadata stored in metadata structure 402a includes data common to each packet or packet fragment being described. For example, the metadata section of a metadata structure may include records or entries containing various information for each packet (or packet fragment). This information may include: header length, payload length, checksum_start, checksum_stuff, checksum_type (e.g., CRC32, 1's complement, full TCP checksum), etc.

Each packet's entry may include a termination bit or indicator to identify the end of the entry. A termination indicator may have one configuration (or value) to indicate the end of an entry, and a different configuration (or value) to signal the end of all entries. Use of termination indicators may preclude any need to store a count of the number of packets or fragments.

Beyond the per-packet information, the metadata section may include generally applicable fields such as a packet or fragment count, information indicating whether the headers and/or payloads are packed, checksum_enabled, checksum_offset, etc.

In one implementation of this embodiment, the per-packet information in a metadata structure may be configured as a linked list, thereby allowing virtually any number of packets or fragments (or an infinite number) to be handled.

Header data and/or payload data may be packed in structures 402a, 402b. If the data are packed, the communication hardware can simply parse through each section (i.e., header data, payload data) based on the length of each packet's headers and payload.

Two DMA (Direct Memory Access) operations may be executed to assemble the payload data and header data reflected in FIG. 4, which may necessitate the second descriptor. In particular, packet payloads may originate in user memory space and be subjected to kernel zero-copy mapping, therefore keeping the payloads separate from the headers generated in kernel space.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

Embodiments of the invention described above may be contrasted with a traditional descriptor ring and traditional descriptors. In the traditional descriptor ring model, for each packet being passed to hardware from a device driver there is a separate descriptor and a separate DMA handle. In addition, a software management structure ring is required for storing per-descriptor DMA handles and message information related to used descriptors while the hardware transmits the corresponding data.

In an embodiment of the invention described above, at most two descriptors and two DMA handles are used, regardless of the number of packets or packet fragments, thereby offering more efficient consumption of ring descriptors and corresponding management structure elements. Traditional and new descriptors may be mixed in a descriptor ring.

What is claimed is:

1. A method of describing multiple packets to a communication apparatus with a single descriptor, the method comprising:
   receiving a header buffer comprising a header for each of N packets, wherein N>1;
   receiving a data buffer comprising a payload for each of said N packets;
   in a single descriptor configured to be read by the communication apparatus, storing:
      a base address of said header buffer;
      a base address of said data buffer;
      a checksum start offset indicating where to compute a checksum on each of said N packets;
      a checksum stuff offset indicating where to store the checksum in each of said N packets; and
      for each of said N packets:
         a length of the payload for said packet;
         a sample of the payload for said packet; and
         a length of the header for said packet.

2. The method of claim 1, further comprising:
   storing in said single descriptor:
      a first indicator configured to indicate whether the headers for said N packets are packed in said header buffer; and
      a second indicator configured to indicate whether the payloads for said N packets are packed in said data buffer.

3. The method of claim 1, further comprising:
   storing in said single descriptor, for each of said N packets, an offset of the packet's header within said header buffer.

4. The method of claim 1, further comprising:
   storing in said single descriptor, for each of said N packets, an offset of the packet's payload within said data buffer.

5. The method of claim 1, wherein the communication apparatus is configured for InfiniBand, the method further comprising:
   storing in said single descriptor:
      an R_key for said header buffer; and
      an R_key for said data buffer.

6. A computer readable medium storing instructions that, when executed by a computer, cause the computer to perform a method of describing multiple packets to a communication apparatus with a single descriptor, the method comprising:
   receiving a header buffer comprising a header for each of N packets, wherein N>1;
   receiving a data buffer comprising a payload for each of said N packets;
   in a single descriptor configured to be read by the communication apparatus, storing:
      a base address of said header buffer;
      a base address of said data buffer;
      a checksum start offset indicating where to compute a checksum on each of said N packets;
      a checksum stuff offset indicating where to store the checksum in each of said N packets; and
      for each of said N packets:
         a length of the payload for said packet;
         a sample of the payload for said packet; and
         a length of the header for said packet.

7. A processor-implementable method of using a single descriptor to facilitate the passing of multiple packets to a communication apparatus from a device driver, the method comprising:
- storing multiple packets' headers contiguously within a header buffer;
- storing payloads of the multiple packets contiguously within a data buffer;
- providing said header buffer and said data buffer to the device driver for the communication apparatus;
- configuring the single descriptor to describe the multiple packets, wherein configuring the single descriptor comprises including in the single descriptor:
  - a base address of said header buffer;
  - a base address of said data buffer;
  - for each packet in the multiple packets:
    - a length of a header of the packet; and
    - a length of a payload of the packet;
  - a checksum start value configured to indicate where, in each of the multiple packets, a checksum computation is to be initiated; and
  - a checksum stuff value configured to indicate where, in each of the multiple packets, a checksum computation is to be stored;
- configuring a second descriptor to reference said single descriptor, wherein said second descriptor is a traditional descriptor configured to describe a single packet;
- passing said single descriptor and the second descriptor to the communication apparatus; and
- at the communication apparatus, reading the second descriptor to access said single descriptor, and using said single descriptor to transmit the multiple packets.

8. The method of claim 7, wherein configuring the single descriptor further comprises including in the single descriptor:
- a packed header indicator configured to indicate whether the multiple packets' headers are packed in said header buffer; and
- a packed data indicator configured to indicate whether the multiple packets' payloads are packed in said data buffer.

9. The method of claim 7, wherein configuring the single descriptor further comprises including in the single descriptor:
- for each packet in the multiple packets, a sample of the packet's payload.

10. A computer readable medium storing instructions that, when executed by a computer, cause the computer to perform a method of using a single descriptor to facilitate the passing of multiple packets to a communication apparatus from a device driver, the method comprising:
- storing multiple packets' headers contiguously within a header buffer;
- storing payloads of the multiple packets contiguously within a data buffer;
- providing said header buffer and said data buffer to the device driver for the communication apparatus;
- configuring the single descriptor to describe the multiple packets, wherein configuring the single descriptor comprises including in the single descriptor:
  - a base address of said header buffer;
  - a base address of said data buffer;
  - for each packet in the multiple packets:
    - a length of a header of the packet; and
    - a length of a payload of the packet;
  - a checksum start value configured to indicate where, in each of the multiple packets, a checksum computation is to be initiated; and
  - a checksum stuff value configured to indicate where, in each of the multiple packets, a checksum computation is to be stored;
- configuring a second descriptor to reference said single descriptor, wherein said second descriptor is a traditional descriptor configured to describe a single packet;
- passing said single descriptor and the second descriptor to the communication apparatus; and
- at the communication apparatus, reading the second descriptor to access said single descriptor, and using said single descriptor to transmit the multiple packets.

11. A computer readable medium containing a data structure configured to describe multiple packets to a communication apparatus for transmitting the multiple packets, the data structure comprising:
- a base address of a header buffer storing headers for the multiple packets;
- a base address of a data buffer storing payloads for the multiple packets;
- for each packet in the multiple packets:
  - a length of a header of the packet; and
  - a length of a payload of the packet;
- a checksum start value configured to indicate where, in each of the multiple packets, a checksum computation is to be initiated;
- a checksum stuff value configured to indicate where, in each of the multiple packets, a checksum computation is to be stored
- a first indicator configured to indicate whether the headers are stored contiguously in said header buffer; and
- a second indicator configured to indicate whether the payloads are stored contiguously in said data buffer.

12. An apparatus for transmitting packets, comprising:
- a reader module configured to read a single descriptor configured to describe multiple packets, wherein said single descriptor comprises:
  - a base address of a header buffer storing headers for the multiple packets;
  - a base address of a data buffer storing payloads for the multiple packets;
  - for each packet in the multiple packets:
    - a length of a header of the packet; and
    - a length of a payload of the packet;
  - a first indicator configured to indicate whether the headers are stored contiguously in said header buffer; and
  - a second indicator configured to indicate whether the payloads are stored contiguously in said data buffer;
- a retrieval module configured to retrieve the multiple packets, wherein said retrieval module comprises:
  - a header retriever configured to retrieve headers for the multiple packets; and
  - a payload retriever configured to retrieve payloads for the multiple packets; and
- a transmitter module configured to transmit the multiple packets.

13. A method of describing multiple packets to a communication apparatus, the method comprising:
- for each packet, configuring a first data structure to identify:
  - a header length;
  - a payload length;

a checksum start value configured to indicate where, in each of the multiple packets, a checksum computation is to be initiated;

a checksum stuff value configured to indicate where, in each of the multiple packets, a checksum computation is to be stored; and a type of checksum;

storing in the first data structure headers for the packets and payloads for a subset of the packets;

configuring a first descriptor to identify the first data structure;

configuring said first descriptor to identify a location of the headers and a location of the payloads within the first data structure;

storing in a second data structure payloads for a subset of the packets;

configuring a second descriptor to identify a location of the payloads within the second data structure; and forwarding said first descriptor and said second descriptor to the communication apparatus to facilitate transmission of the packets.

14. A computer readable medium containing data structures for facilitating transmission of multiple packets from a communication apparatus, the data structures comprising:

a first metadata structure configured to include:
 a metadata section configured to identify, for each of the multiple packets:
  a header length; and
  a payload length; and
 a header section configured to store headers for the multiple packets;

a first descriptor configured to identify:
 a memory location of said first metadata structure; and
 a location of said header section within said first metadata structure; and a checksum start value configured to indicate where, in each of the multiple packets, a checksum computation is to be initiated; and a checksum stuff value configured to indicate where, in each of the multiple packets, a checksum computation is to be stored.

15. The computer readable medium of claim 14, further comprising:

a second metadata structure configured to store payloads for the multiple packets; and a second descriptor configured to identify a memory location of said second metadata structure.

16. The computer readable medium of claim 14, wherein:

said first metadata structure is further configured to include:
 a payload section configured to store payloads for the multiple packets; and said first descriptor is further configured to identify:
 a location of said payload section within said first metadata structure.

17. The computer readable medium of claim 14, wherein:

said first metadata structure is further configured to identify:

a type of checksum for checksumming the multiple packets.

* * * * *